United States Patent
Nakagawa

(10) Patent No.: US 7,558,008 B2
(45) Date of Patent: Jul. 7, 2009

(54) PHOTOGRAPHING LENS UNIT INCLUDING PLURALITY OF LENSES AND IMAGING APPARATUS WITH THE SAME

(75) Inventor: Youhei Nakagawa, Neyagawa (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 12/058,974

(22) Filed: Mar. 31, 2008

(65) Prior Publication Data
US 2008/0239516 A1    Oct. 2, 2008

(30) Foreign Application Priority Data
Mar. 30, 2007    (JP) .............................. 2007-092229

(51) Int. Cl.
*G02B 9/34*    (2006.01)

(52) U.S. Cl. ..................................... 359/773
(58) Field of Classification Search ......... 359/754–757, 359/763, 764, 766, 773
See application file for complete search history.

(56) References Cited

U.S. PATENT DOCUMENTS
2007/0081259 A1*  4/2007  Noda ..................... 359/774

FOREIGN PATENT DOCUMENTS

| JP | 03-288811 A | 12/1991 |
| JP | 08-262322 A | 10/1996 |
| JP | 09-258100 A | 10/1997 |
| JP | 11-038316 A | 2/1999 |
| JP | 2002-228922 A | 8/2002 |
| JP | 2003-255222 A | 9/2003 |
| JP | 2004-246166 A | 9/2004 |

\* cited by examiner

*Primary Examiner*—Darryl J Collins
(74) *Attorney, Agent, or Firm*—Westerman, Hattori, Daniels & Adrian, LLP.

(57) ABSTRACT

In a photographing lens unit, an aperture diaphragm, a first lens having positive refractive power, a second lens having negative refractive power, a third lens of a positive meniscus lens with a concave surface on the object side, an ND filter, a fourth lens of a negative meniscus lens with a convex surface on the object side, an IR cut filter, and an imaging element are disposed in order from the object side to the imaging element side. In the third lens, a surface shape on the object side changes from concave to convex as it is away from an optical axis, and a surface shape on the image side changes from convex to concave as it is away from the optical axis. In the fourth lens, a surface shape on the object side changes from convex to concave as it is away from the optical axis.

10 Claims, 15 Drawing Sheets

| No. | $R_i$ | $D_i$ | $N_i$ | $\nu_i$ | REMARKS |
|---|---|---|---|---|---|
| 1 | ∞ | 0 | | | |
| 2 | 2.250063 | 1.15 | 1.754 | 52.3 | SPHERICAL |
| 3 | -6.043573 | 0.05 | 1.61 | 29 | SPHERICAL |
| 4 | 3.135941 | 0.375 | | | ASPHERICAL |
| 5 | -4.920736 | 0.710479 | 1.5251 | 56.2 | ASPHERICAL |
| 6 | -4.467453 | 0.7 | | | ASPHERICAL |
| 7 | ∞ | 0.3 | 1.64 | 38 | ND FILTER |
| 8 | ∞ | 0.291584 | | | |
| 9 | 3.619192 | 0.699634 | 1.5251 | 56.2 | ASPHERICAL |
| 10 | 1.987983 | 0.2 | | | ASPHERICAL |
| 11 | ∞ | 0.3 | 1.523 | 58.6 | IR CUT FILTER |
| 12 | ∞ | 1.041078 | | | |

| Ri | K | A4 | A6 | A8 | A10 |
|---|---|---|---|---|---|
| R4 | 0 | 0.013310 | 0.022329 | 0.004438620 | 0.002535501 |
| R5 | −11.0565 | −0.012301 | 0.088663 | −0.020129 | 0.003278040 |
| R6 | −4.72456 | −0.007222172 | 0.053706 | −0.001741522 | −0.0009014769 |
| R9 | −11.4934 | −0.119899 | 0.037136 | −0.006386367 | 0.0005372638 |
| R10 | −8.06059 | −0.064301 | 0.012544 | −0.001507444 | 0.00005617933 |

$$h^2 = x^2 + y^2$$
$$z = \frac{ch^2}{1+\sqrt{1-(K+1)c^2h^2}} + A_4 h^4 + A_6 h^6 + A_8 h^8 + A_{10} h^{10}$$

| No. | Ri | Di | Ni | νi | REMARKS |
|---|---|---|---|---|---|
| 1 | ∞ | 0 | | | |
| 2 | 2.632370 | 0.93 | 1.816 | 46.6 | SPHERICAL |
| 3 | -17.172806 | 0.065 | | | SPHERICAL |
| 4 | -8.317053 | 0.7 | 1.808 | 22.8 | SPHERICAL |
| 5 | 4.488331 | 0.240645 | | | SPHERICAL |
| 6 | -12.626134 | 0.846841 | 1.5251 | 56.2 | ASPHERICAL |
| 7 | -3.221898 | 0.6 | | | ASPHERICAL |
| 8 | ∞ | 0.3 | 1.64 | 38 | ND FILTER |
| 9 | ∞ | 0.278798 | | | |
| 10 | 4.033101 | 0.7 | 1.5251 | 56.2 | ASPHERICAL |
| 11 | 1.942732 | 0.185 | | | ASPHERICAL |
| 12 | ∞ | 0.3 | 1.523 | 58.6 | IR CUT FILTER |
| 13 | ∞ | 1.008678 | | | |

| Ri | K | A4 | A6 | A8 | A10 |
|---|---|---|---|---|---|
| R6 | −11.0565 | −0.034610 | 0.052529 | −0.017853 | 0.002810440 |
| R7 | −4.724656 | −0.037494 | 0.029794 | 0.007375293 | −0.001555087 |
| R10 | −11.4934 | −0.127669 | 0.041800 | −0.005920034 | 0.0003532718 |
| R11 | −8.06059 | −0.058095 | 0.012517 | −0.001430438 | 0.0000663566 |

$$h^2 = x^2 + y^2$$
$$z = \frac{ch^2}{1 + \sqrt{1-(K+1)c^2h^2}} + A_4 h^4 + A_6 h^6 + A_8 h^8 + A_{10} h^{10}$$

PHOTOGRAPHING LENS UNIT INCLUDING PLURALITY OF LENSES AND IMAGING APPARATUS WITH THE SAME

BACKGROUND OF THE INVENTION

1. Field of the Invention

The present invention relates to a photographing lens unit and an imaging apparatus with the same, and more specifically, to a photographing lens unit including a plurality of lenses and an imaging apparatus in which a camera module with such a photographing lens unit is incorporated.

2. Description of the Background Art

In recent years, the demands for downsizing, reduction in weight, reduction in cost, and enhancement in image quality have been crucial to a photographing lens unit such as a mobile phone camera and digital camera, and particularly, in a photographing lens unit of a mobile phone camera, these demands have become stronger and stronger. On the other hand, in a mobile phone camera, the demand for high performance as a camera is also strong, and a camera module having an imaging element of 3 megapixels or more has been introduced.

The camera of 3 megapixels or more, even if it is a mobile phone camera, has performance similar to that of a thin digital camera. When such a high performance camera is mounted on a mobile phone, an optical part, such as an adjustable diaphragm and an ND (Neutral Density) filter used in a digital camera, is required in the photographing lens unit.

As a configuration of the photographing lens unit of 3 megapixels or more, about three or four lenses are often used. As the configuration of such a photographing lens unit, the following have been devised.

A photographing lens system described in Japanese Patent Laying-Open No. 03-288811 includes a plurality of plastic lenses arrayed on an optical axis, and one glass lens arranged in an intermediate position of the plurality of plastic lenses. Among the photographing lenses, only the glass lens is provided with an image formation action.

A wide angle lens system described in Japanese Patent Laying-Open No. 08-262322 is constituted by a first lens having negative refractive power, a second lens having positive refractive power, and third and fourth lenses each made of synthetic resin and having positive refractive power in order from the object side. These compound lenses are configured so that a synthetic focal distance and an Abbe number thereof satisfy predetermined conditions.

A photographing lens system described in Japanese Patent Laying-Open No. 09-258100 is constituted by four single lenses of a first biconvex lens, a second biconcave lens with a strong concave surface facing the object side, a positive third lens with a strong convex surface facing the image side, and a fourth lens with a strong convex surface facing the object side in order from the object side.

An imaging lens system described in Japanese Patent Laying-Open No. 11-038316 is constituted by a first lens having a negative refractive index with a concave surface facing the object side, and a subsequent lens group in order from the object side. A first lens group satisfies a predetermined condition equation with respect to a curvature radius, and the subsequent lens group has at least one negative lens element.

A photographing lens system described in Japanese Patent Laying-Open No. 2002-228922 is constituted by a first lens group of a first lens, which is a positive lens, and a second lens, which is a negative lens, a second lens group of a third lens, which is a positive lens with at least one refractive surface formed into an aspherical shape, and a third lens group of a fourth lens, which is a negative lens with at least one refractive surface formed into an aspherical shape, in order from the object side.

A photographing lens system described in Japanese Patent Laying-Open No. 2003-255222 includes a first lens group of a first lens having positive refractive power and a second lens having negative refractive power, a second lens group including a meniscus lens with at least one refractive surface formed into an aspherical shape and with a concave surface facing the object side, and an aspherical third lens group.

A wide angle monofocal lens system described in Japanese Patent Laying-Open No. 2004-246166 includes a first lens having a meniscus shape with a concave surface facing the object side, a second lens having positive power with a concave-shaped surface on the object side, a third lens having a meniscus shape with a convex surface facing the image surface side, and a fourth lens having a meniscus shape with a concave surface facing the image surface side, in order from the object side.

The use of an optical part such as an adjustable diaphragm and an ND filter in a photographing lens unit makes it difficult to realize downsizing as a whole and a favorable optical property.

For example, in the case where the adjustable diaphragm and the ND filter are arranged on the object side of the photographing lens unit, an entire length obtained by adding the thicknesses of the adjustable diaphragm and the ND filter to the entire length of the photographing lens unit is the entire length as a camera module. Therefore, even when the entire length of the photographing lens unit is short, the entire length as the camera module becomes long.

In the case where the adjustable diaphragm and the ND filter are arranged on the image side of the photographing lens unit, a back focal distance of the photographing lens unit corresponding to a distance from a lens rear end portion to an imaging surface becomes long, which makes the design of the photographing lens unit difficult.

Consequently, it is considered that when the optical part such as the adjustable diaphragm and the ND filter is arranged between the lenses of the photographing lens unit, the entire length of the photographing lens unit becomes longer, but the entire length as the camera module can be shorter. However, the arrangement of the optical part such as the adjustable diaphragm and the ND filter between the lenses increases a lens distance. This deteriorates eccentricity accuracy in front and in rear of the optical member, and gives rise to the need to move the lenses while avoiding the optical member at the time of focusing.

Moreover, the arrangement of the optical part such as the adjustable diaphragm and the ND filter between the lenses of the photographing lens unit results in arranging the lenses while avoiding the adjustable diaphragm and the ND filter. Therefore, an uneven thickness difference, which is a difference between a minimum thickness and a maximum thickness in each of the lenses arranged in front and in rear of the adjustable diaphragm and the ND filter, cannot be secured. In this case, it becomes difficult to eliminate aberrations of the lenses.

SUMMARY OF THE INVENTION

An object of the present invention is to provide a photographing lens unit that is small as a whole and has a favorable optical property, and an imaging apparatus using the same.

According to an aspect of the present invention, a photographing lens unit includes a first lens having positive refractive power, a second lens that is disposed on the image side with respect to the first lens and has negative refractive power, a third lens that is disposed on the image side with respect to the second lens and is a positive meniscus lens with a concave surface on the object side thereof, and a fourth lens that is disposed on the image side with respect to the third lens and is a negative meniscus lens with a convex surface on the object side thereof. A surface shape of the third lens changes from a concave surface to a convex surface on the object side as the surface shape is away from an optical axis, and changes from a convex surface to a concave surface on the image side as the surface shape is away from the optical axis. A surface shape of the fourth lens changes from a convex surface to a concave surface on the object side as the surface shape is away from the optical axis, and changes from a concave surface to a convex surface on the image side as the surface shape is away from the optical axis.

Preferably, the photographing lens unit further includes an imaging element that receives light transmitted through the fourth lens. A space for arranging an optical member is provided between the third lens and the fourth lens. The optical member is a member that limits an amount of light entering the imaging element, or a member that bends an optical axis of the light entering the imaging element.

Preferably, the first lens, the second lens, and the third lens are moved along the optical axis at the time of focusing operation.

Preferably, the first lens and the second lens constitute a hybrid lens formed of different materials.

Preferably, an Abbe number of the third lens is 35 or less.

According to another aspect of the present invention, an imaging apparatus includes a photographing lens unit, and the photographing lens unit includes a first lens having positive refractive power, a second lens that is disposed on the image side with respect to the first lens and has negative refractive power, a third lens that is disposed on the image side with respect to the second lens and is a positive meniscus lens with a concave surface on the object side thereof, and a fourth lens that is disposed on the image side with respect to the third lens and is a negative meniscus lens with a convex surface on the object side thereof. A surface shape of the third lens changes from a concave surface to a convex surface on the object side as the surface shape is away from an optical axis, and changes from a convex surface to a concave surface on the image side as the surface shape is away from the optical axis. A surface shape of the fourth lens changes from a convex surface to a concave surface on the object side as the surface shape is away from the optical axis, and changes from a concave surface to a convex surface on the image side as the surface shape is away from the optical axis.

According to the present invention, the downsizing as an entire camera module and a favorable optical property can be realized.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
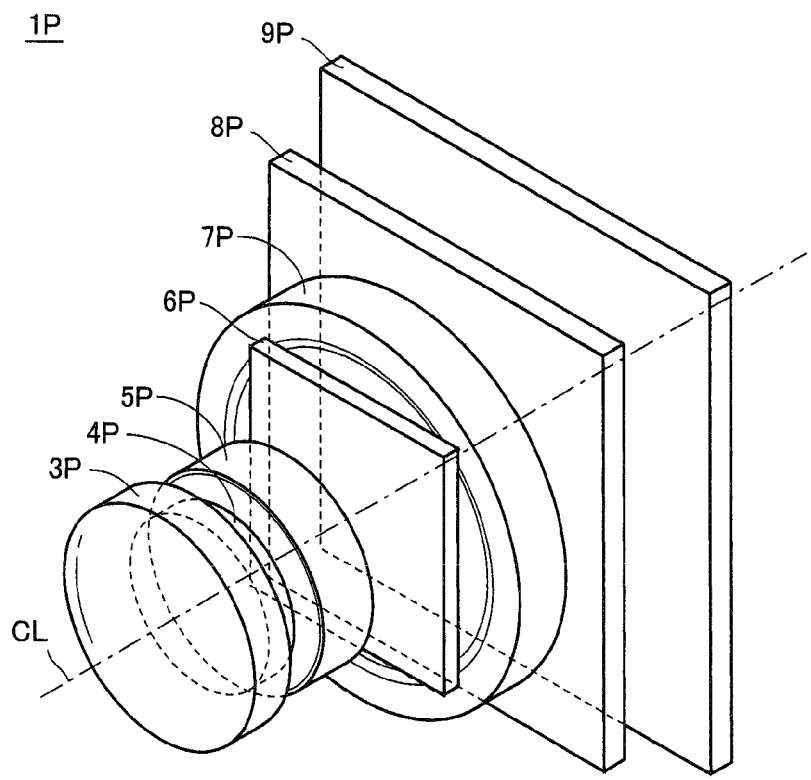
FIG. 1 is a perspective view showing a schematic configuration of a photographing lens unit according to a first embodiment of the present invention.

Preferred embodiments of the present invention will be described hereinafter with reference to the drawings. The same parts or equivalent parts are indicated by the same reference characters, and the description thereof is not repeated.

First Embodiment

FIG. 1 is a perspective view showing a schematic configuration of a photographing lens unit 1P according to a first embodiment of the present invention.

Figure 2:
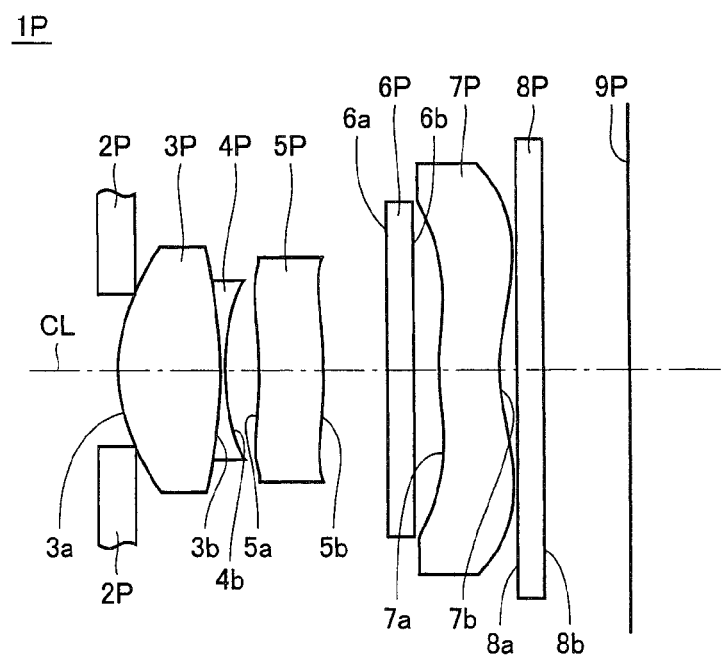
FIG. 2 is a cross-sectional view along an optical axis of the photographing lens unit according to the first embodiment of the present invention.

FIG. 2 is a cross-sectional view along an optical axis CL of photographing lens unit 1P according to the first embodiment of the present invention.

Referring to FIGS. 1 and 2, in photographing lens unit 1P of the first embodiment, an aperture diaphragm 2P, a first lens 3P having positive refractive power, a second lens 4P having negative refractive power, a third lens 5P of a positive meniscus lens, an ND filter 6P, a fourth lens 7P of a negative meniscus lens, an IR (infrared) cut filter 8P, and an imaging element 9P are disposed in order from the object side to the imaging element side. The definitions of the positive and negative refractive power and the meniscus lens will be described later. In FIG. 1, aperture diaphragm 2P is not shown for simplicity. In FIG. 2, the object side refers to the left side, and the image side refers to the right side.

First lens 3P and second lens 4P are desirably a hybrid lens obtained by combining different materials to join each other. In a lens unit constituted by a plurality of lenses such as photographing lens unit 1P, the thicknesses of the lenses are a significant factor in determining the entire length of the lens unit. However, if the thickness of each of the lenses is made thinner, a crack easily occurs in the glass lens, and deformation in the plastic lens. Therefore, in each of the lenses, the thickness of 0.5 mm or more is required at the thinnest position.

As shown in FIG. 2, by using a hybrid lens for first lens 3P and second lens 4P, the thickness can be made thinner by the thickness of one lens. In the hybrid lens of FIG. 2, since first lens 3P of the glass lens as a base material exists, second lens 4P of a resin lens can be advantageously molded so as to have a thickness of 0.1 mm or less.

First lens 3P has a function of condensing light. Moreover, in second lens 4P, by making a resin portion aspherical, spherical aberration can be eliminated and at the same time, chromatic aberration can also be eliminated. This can favorably suppress the aberration of the hybrid lens as a whole.

Third lens 5P is a positive meniscus lens with a concave surface on the object side. Fourth lens 7P is a negative meniscus lens with a convex surface on the object side. Third lens 5P and fourth lens 7P are, for example, plastic lenses. The meniscus lens refers to a crescent-shaped lens in which if one surface is a concave surface, the other surface is a convex surface, while if one surface is a convex surface, then the other surface is a concave surface.

More specifically, third lens 5P has a shape in which the surface shape on the object side is concave in the vicinity of the optical axis, and as it is away from the optical axis, the shape changes from concave to convex, and at the same time, the surface shape on the image side is convex in the vicinity of the optical axis, and as it is away from the optical axis, the shape changes from convex to concave. On the contrary, fourth lens 7P has a shape in which the surface shape on the object side is convex in the vicinity of the optical axis, and as it is away from the optical axis, the shape changes from convex to concave, and at the same time, the surface shape on the image side is concave in the vicinity of the optical axis, and as it is away from the optical axis, the shape changes from concave to convex.

By forming and arranging third lens 5P and fourth lens 7P as described above, the aberrations can be favorably corrected while minimizing spatial loss due to the projection of the concave lens of second lens 4P. As a result, photographing lens unit 1P can be downsized as a whole.

Moreover, between third lens 5P and fourth lens 7P, a predetermined space for inserting an optical member is provided. Although the arrangement of the optical member on optical axis CL allows desired characteristics to be added to the camera module of photographing lens unit 1P, it results in an increase in size as the camera module. Consequently, the arrangement of a desired optical member in the above-described predetermined space can suppress the increase in size as the camera module.

The optical member arranged in the above-described space is desirably a member that limits an amount of light entering imaging element 9P, or a member that bends the optical axis of the light entering imaging element 9P. As the member that limits an amount of light, there are, for example, an ND filter, a shutter, a low-pass filter, and the like. As the member that bends the optical axis, there are a mirror, a prism, and the like.

Moreover, the above-described space is desirably provided so as to be 1.0 mm or more in view of a case where a shutter having a predetermined size is provided as the optical member, and the like. Even when an optical member thinner than 1.0 mm is provided as the above-described optical member, a certain amount of space needs to be given between each of the lenses and the optical member in view of impact resistance.

When photographing lens unit 1P is focused, first lens 3P, second lens 4P, and third lens 5P are desirably fed out toward the object side to perform focusing. Generally, when the focusing is performed, a method of moving the overall lens unit is used. However, when the optical member is arranged in the lens unit as described above, at the time of focusing, a method of moving the lens unit together with the optical member, and a method of making the lens unit and the optical member independent of each other to move only the lens unit are considered.

In the case where the lens unit is moved together with the optical member, the weight of the optical member is generally larger than the weight of the lens unit, thereby increasing necessary power consumption. In the case where the lens unit and the optical member are made independent of each other to move only the lens unit, the space for the optical member in the lens unit needs to be enlarged by a driving amount of the lens, resulting in an increase in size as the camera module.

Consequently, at the time of the focusing in the case where the optical member is arranged in the lens unit, by moving only first lens 3P, second lens 4P, and third lens 5P, which are a lens group on the object side of the optical member in the lens unit, the downsizing as the overall camera module is enabled without increasing the power consumption.

Since first lens 3P, second lens 4P, and third lens 5P have higher integrity as compared with fourth lens 7P, it is most preferable that the predetermined space is provided between third lens 5P and fourth lens 7P, and that first lens 3P, second lens 4P, and third lens 5P are integrally moved. Since first lens 3P and second lens 4P also have high integrity, only first lens 3P and second lens 4P may be integrally moved.

Figure 3:
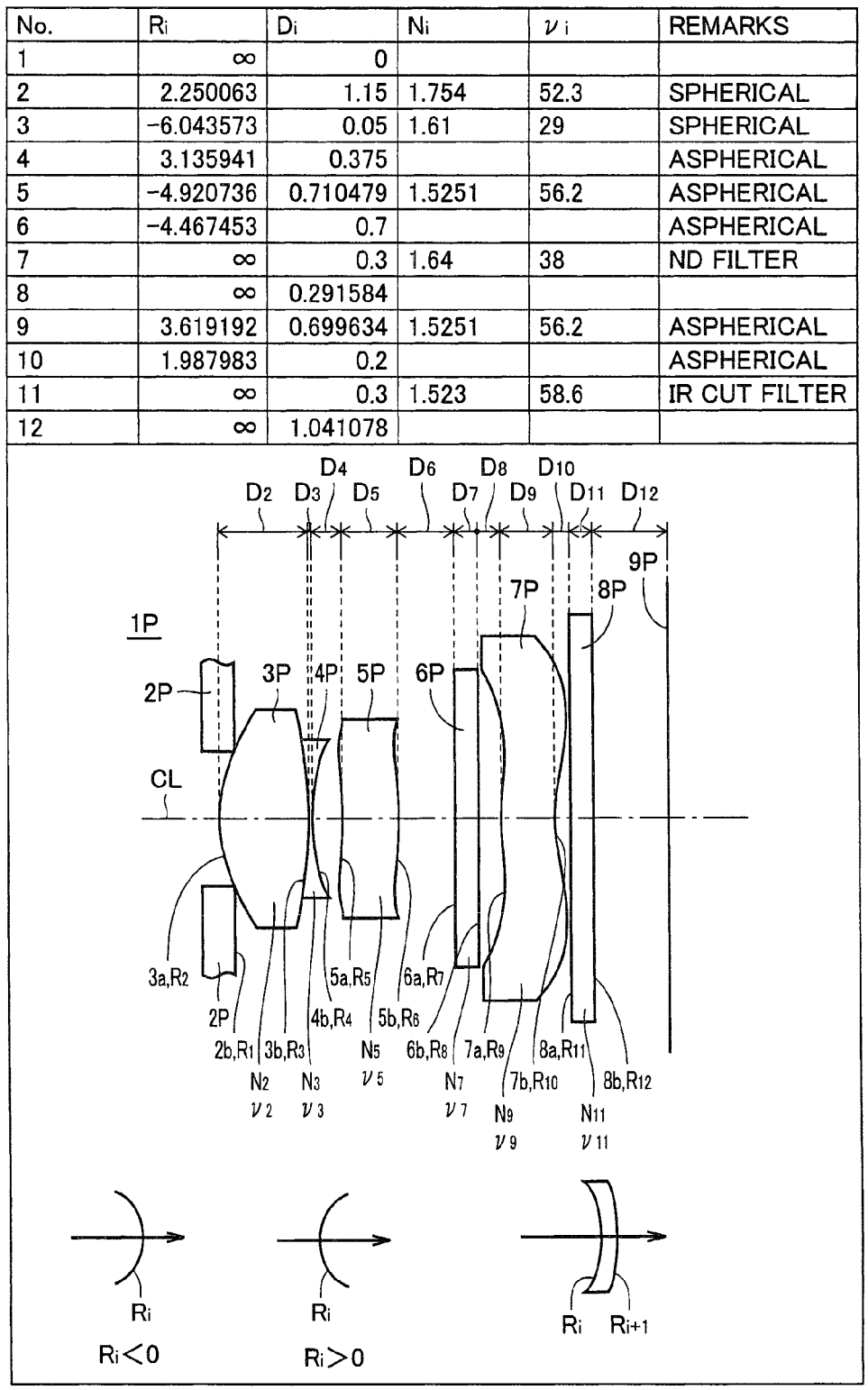
FIG. 3 is a diagram showing shapes and arrangement relations of the photographing lens unit according to the first embodiment of the present invention.

Next, shapes, arrangement relations, and the like of first lens 3P to fourth lens 7P constituting the above-described photographing lens unit 1P will be described in more detail with reference to FIG. 3. FIG. 3 is a diagram showing the shapes and the arrangement relations of photographing lens unit 1P according to the first embodiment of the present invention.

Referring to FIG. 3, photographing lens unit 1P of the first embodiment is a compound lens for the imaging element of ⅓ inches with a synthetic focal distance f=5.2 mm, an F number FNO=3, and a half angle of view of 30 degrees. The half angle of view will be described later. Although it is not shown in FIG. 3, a vane with ND filter 6P is set between third lens 5P and fourth lens 7P so as to take out and put in ND filter 6P on the optical axis.

In FIG. 3, Ri denotes a curvature radius of a surface, Di denotes a surface distance, Ni denotes a refractive index, and vi is an Abbe number. A suffix "i" denotes a surface number labeled in order from the object side to the image side. More specific description is as follows.

"i=1" denotes a surface number of aperture diaphragm 2P on the image side. "i=2 to 6" denotes surface numbers of lens surfaces 3a and 5a of first lens 3P to third lens 5P on the object side and surface numbers of lens surfaces 3b, 4b, and 5b on the image side. "i=7, 8" denotes surface numbers of ND filter 6P. "i=9, 10" denotes a surface number of a lens surface 7a of fourth lens 7P on the object side and a surface number of a lens surface 7b on the image side. "i=11, 12" denotes surface numbers of IR cut filter 8P.

First, curvature radius Ri of first lens 3P to fourth lens 7P will be described. As shown in a lower portion of FIG. 3, curvature radius Ri of each of the lens surfaces that are convex from the object side to the image side takes a negative value, while curvature radius Ri of each of the lens surfaces that are convex from the image side to the object side takes a positive value. The direction from the object side to the image side is a direction indicated by arrows in the lower portion of FIG. 3.

When third lens 5P is taken notice of, a curvature radius R5 of lens surface 5a on the object side is a negative value, and a curvature radius R6 of lens surface 5b on the image side is also a negative value. Accordingly, as described before, third lens 5P is a positive meniscus lens, in which lens surface 5a on the object side is a concave surface and lens surface 5b on the image side is a convex surface around the optical axis.

When fourth lens 7P is taken notice of, a curvature radius R9 of lens surface 7a on the object side is a positive value, and a curvature radius R10 of lens surface 7b on the image side is also a positive value. Accordingly, as described above, fourth lens 7P is a negative meniscus lens, in which lens surface 7a on the object side is a convex surface, and lens surface 7b on the image side is a concave surface around the optical axis.

Moreover, in each of first lens 3P to fourth lens 7P, if Ri is a curvature radius of an I surface, Ni is a refractive index between I surface and an I+1 surface, and Di is a surface distance between I surface and I+1 surface, the refractive power of the lens constituted by I surface and I+1 surface is represented by $(N_i-1)\{1/R_i-1/R_{i+1}+(N_i-1)D_i/N_iR_iR_{i+1}\}$. If the refractive power is a positive value, the lens is a lens having positive refractive power (positive lens). If the refractive power is a negative value, the lens is a lens having negative refractive power (negative lens).

In photographing lens unit 1P of FIG. 3, the refractive power of first lens 3P is a positive value, and the refractive power of second lens 4P is a negative value. Moreover, the refractive power of third lens 5P is a positive value, and the refractive power of fourth lens 7P is a negative value. Accordingly, first lens 3P and third lens 5P are lenses each having positive refractive power, and second lens 4P and fourth lens 7P are lenses each having negative refractive power. Since a surface 2b of aperture diaphragm 2P on the image side, a surface 6a on the object side and a surface 6b on the image side of ND filter 6P, and a surface 8a on the object side and a surface 8b on the image side of IR cut filter 8P are all flat surfaces, corresponding curvature radii R1, R7, R8, R11, and R12 are all infinity.

Next, surface distance Di of photographing lens unit 1P will be described. In the surface distance, with a coordinate axis on optical axis CL, and with an origin at a position of surface 2b of aperture diaphragm 2P on the image side, the direction from the object side to the image side is positive. Surface distance Di is a value obtained by subtracting a coordinate axis where an i-th surface crosses optical axis CL from a coordinate value of a point where an (i+1)-th surface crosses optical axis CL.

For example, a surface distance D2 is a value obtained by subtracting a coordinate value of a point where lens surface 3a of first lens 3P on the object side crosses optical axis CL from a coordinate value of a point where lens surface 3b on the image side crosses optical axis CL. Surface distance D2 corresponds to a thickness of first lens 3P on optical axis CL.

Similarly, a surface distance D3 corresponds to a thickness of second lens 4P on optical axis CL. A surface distance D5 corresponds to a thickness of third lens 5P on optical axis CL. A surface distance D7 corresponds to a thickness of ND filter 6P on optical axis CL. In photographing lens unit 1P, the thickness of the ND filter member on the optical axis is 0.8 mm, in which the thickness of ND filter 6P is 0.3 mm. A surface distance D9 corresponds to a thickness of fourth lens 7P on optical axis CL. A surface distance D11 corresponds to a thickness of IR cut filter 8P on optical axis CL.

On the other hand, a surface distance D4 denotes a distance on optical axis CL between second lens 4P and third lens 5P. A surface distance D6 denotes a distance on optical axis CL between third lens 5P and ND filter 6P. A surface distance D8 denotes a distance on optical axis CL between ND filter 6P and fourth lens 7P. A surface distance D10 denotes a distance on optical axis CL between fourth lens 7P and IR cut filter 8P. A surface distance D12 denotes a distance on optical axis CL between IR cut filter 8P and imaging element 9P.

Next, refractive index Ni in photographing lens unit 1P will be described. Refractive index Ni denotes refractive indexes of first lens 3P to fourth lens 7P, ND filter 6P, and IR cut filter 8P each constituted by (i+1)-th surface and i-th surface. More specifically, a refractive index N2 denotes a refractive index of first lens 3P. A refractive index N3 denotes a refractive index of second lens 4P. A refractive index N5 denotes a refractive index of third lens 5P. A refractive index N7 denotes a refractive index of ND filter 6P. A refractive index N9 denotes a refractive index of fourth lens 7P. A refractive index N11 denotes a refractive index of IR cut filter 8P. In IR cut filter 8P, an IR cut layer is formed on a cover glass.

Next, Abbe number vi in photographing lens unit 1P will be described. The Abbe number is a constant of an optical medium indicating a ratio of the degree of refraction to dispersion, meaning the degree to which light of a different wavelength is bent in a different direction. A refractive index with respect to a wavelength of 587.6 nm (d line: yellow) is $n_d$, a refractive index with respect to a wavelength of 486.1 nm (F line: blue) is $n_F$, and a refractive index with respect to a wavelength of 656.3 nm (c line: red) is $n_c$. At this time, Abbe number vd in the wavelength of 587.6 nm (d line: yellow) is calculated by $vd=(n_d-1)/(n_F-n_c)$.

Abbe number vi denotes Abbe numbers of first lens 3P to fourth lens 7P, ND filter 6P, and IR cut filter 8P each constituted by (i+1)-th surface and i-th surface. More specifically, an Abbe number v2 denotes an Abbe number of first lens 3P. An Abbe number v3 denotes an Abbe number of second lens 4P. An Abbe number v5 denotes an Abbe number of third lens 5P. An Abbe number v7 denotes an Abbe number of ND filter 6P. An Abbe number v9 denotes an Abbe number of fourth lens 7P. An Abbe number v11 denotes an Abbe number of IR cut filter 8P.

The Abbe numbers of first lens 3P and second lens 4P desirably satisfy $v1-v2>10$. This is because if the relation of the Abbe numbers is $v1-v2 \leqq 10$, chromatic aberration cannot be reduced sufficiently in second lens 4P having a function of achromatism. In first lens 3P and second lens 4P, which are a hybrid lens, if second lens 4P is made of resin, a curvature of the resin layer tends to be small. When the curvature of the resin layer becomes small, a difference between a minimum thickness and a maximum thickness of the resin layer (uneven thickness difference) becomes large, which makes the manufacturing of the lens difficult.

In order to solve the above-described problem of uneven thickness difference in the resin layer, the Abbe number of third lens 5P desirably satisfies $v3<35$. This is because the image side of third lens 5P also has a role of reducing chromatic aberration, and by keeping the Abbe number of third lens 5P lower, the uneven thickness difference of the resin layer of the hybrid lens (second lens 4P) can be made smaller.

While, among plastic materials, there are materials of Abbe numbers 20 to 35, once the Abbe number exceeds 35, there are few plastic materials suitable for the lens until about the Abbe number 45. Therefore, the Abbe number 35 is one reference for the low Abbe number. As with a material of model number E48R (refractive index 1.531, Abbe number 56), the Abbe number larger than 35 causes so-called color blurring.

Next, the respective shapes of each of the lens surfaces of first lens 3P to fourth lens 7P will be described. As shown in FIG. 3, lens surfaces 3a and 3b (i=2, 3) of first lens 3P are of spherical lens. On the other hand, lens surface 4b (i=4) of second lens 4P on the image side, lens surfaces 5a and 5b (i=5, 6) of third lens 5P, lens surfaces 7a and 7b (i=9, 10) of fourth lens 7P are of aspherical lens.

Figure 4:
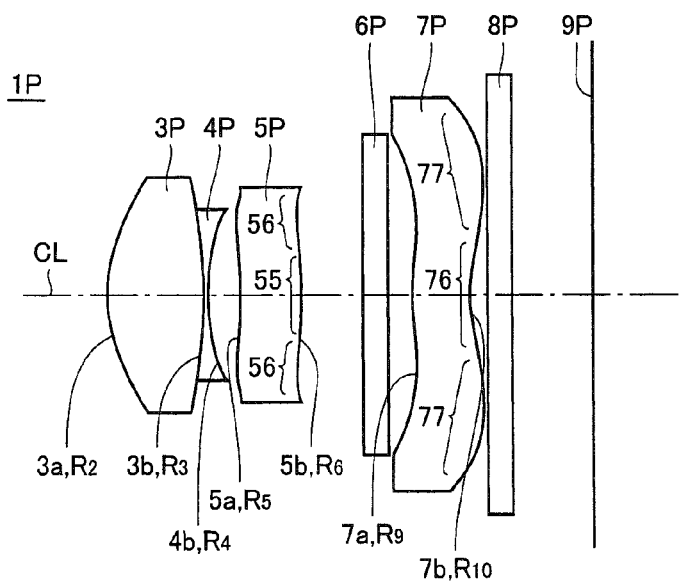
FIG. 4 is a diagram showing characteristics of aspherical lenses in the photographing lens unit according to the first embodiment of the present invention.
Figure 4:
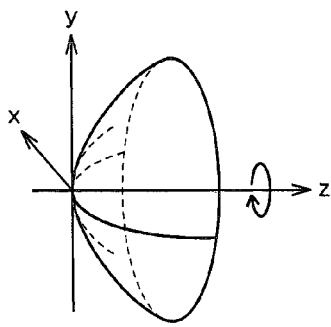

FIG. 4 is a diagram showing characteristics of aspherical lenses in photographing lens unit 1P according to the first embodiment of the present invention. In FIG. 4, aperture diaphragm 2P is not shown for simplicity.

Referring to FIG. 4, aspherical lens surfaces 4b, 5a, 5b, 7a, and 7b are represented by assigning corresponding values to coefficients A4, A6, A8, and A10 in an equation shown in the lower portion of FIG. 4. Lens surfaces 4b, 5a, 5b, 7a, and 7b correspond to curvature radii R4, R5, R6, R9, and R11, respectively. In the equation, "z" denotes a depth from a tangent plane to a surface vertex. "c" denotes a paraxial curvature of a surface. "h" denotes a height from the optical axis. "K" denotes a cone constant. A4, A6, A8, and A10 denote fourth, sixth, eighth, and tenth-degree aspherical surface coefficients, respectively.

According to the equation in the lower portion of FIG. 4, for example, lens surface 5b (i=6) of third lens 5P on the image side changes from a convex surface 55 to a concave surface 56 as it is away from optical axis CL. Moreover, for example, lens surface 7b (i=10) of fourth lens 7P on the image side changes from a concave surface 76 to a convex surface 77 as it is away from optical axis CL.

Figure 5:
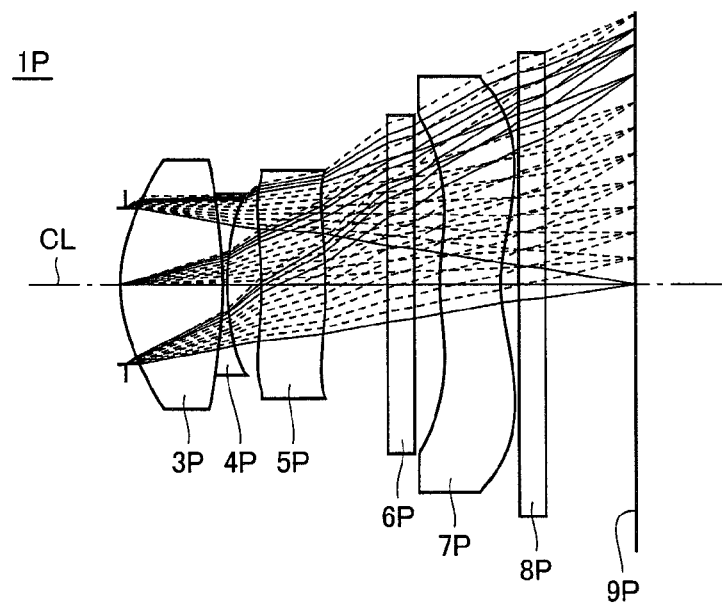
FIG. 5 is a diagram showing a portion of an optical path in the photographing lens unit according to the first embodiment of the present invention.

FIG. 5 is a diagram showing a portion of an optical path in photographing lens unit 1P according to the first embodiment of the present invention. In FIG. 5, aperture diaphragm 2P is not shown for simplicity. In FIG. 5, with respect to photographing lens unit 1P, portions of trajectories of rays (optical paths) when half angle of view is changed from 0 degree to 30 degrees are shown. As shown in FIG. 5, the half angle of view becomes larger as it is away from optical axis CL until the half angle of view becomes 30 degrees at an end portion of imaging element 9P.

Next, as optical properties of photographing lens unit 1P, there are shown evaluation results of curvature of field, distortion aberration, longitudinal aberration, and lateral aberration by simulations based on three wavelengths ($\lambda$=486 nm, 567 nm, 656 nm).

Figure 6:
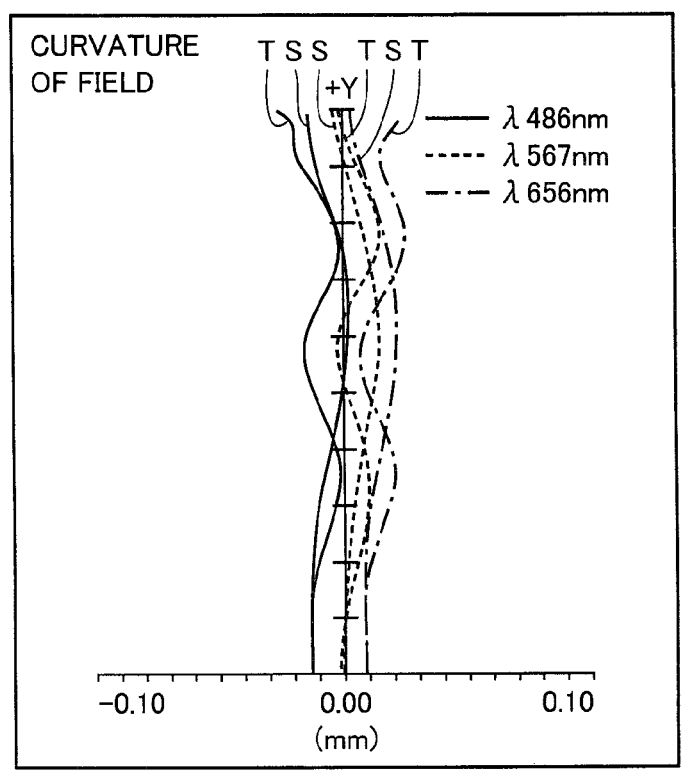
FIG. 6 is a graph showing simulation results of curvature of field in the photographing lens unit according to the first embodiment of the present invention.

FIG. 6 is a graph showing simulation results of curvature of field in photographing lens unit 1P according to the first embodiment of the present invention. As shown in FIG. 6, it was confirmed that in the respective wavelengths, deviation amounts from the image surface, regardless of a tangential plane T and a sagittal plane S, are within the range of a desired standard (±0.10 mm).

Figure 7:
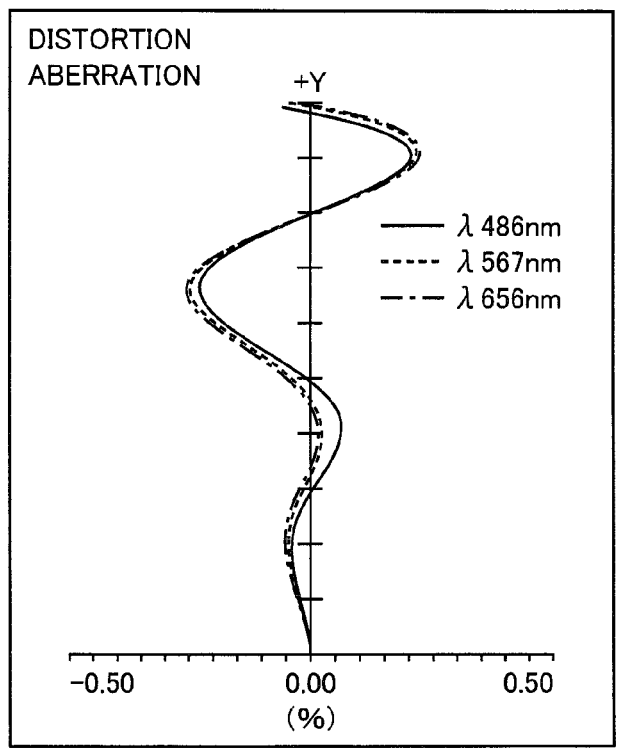
FIG. 7 is a graph showing simulation results of distortion aberration in the photographing lens unit according to the first embodiment of the present invention.

FIG. 7 is a graph showing simulation results of the distortion aberration in photographing lens unit 1P according to the first embodiment of the present invention. As shown in FIG. 7, it was confirmed that in the respective wavelengths, distortions of photographing lens unit 1P are within the range of a desired standard (0.50%).

Figure 8:
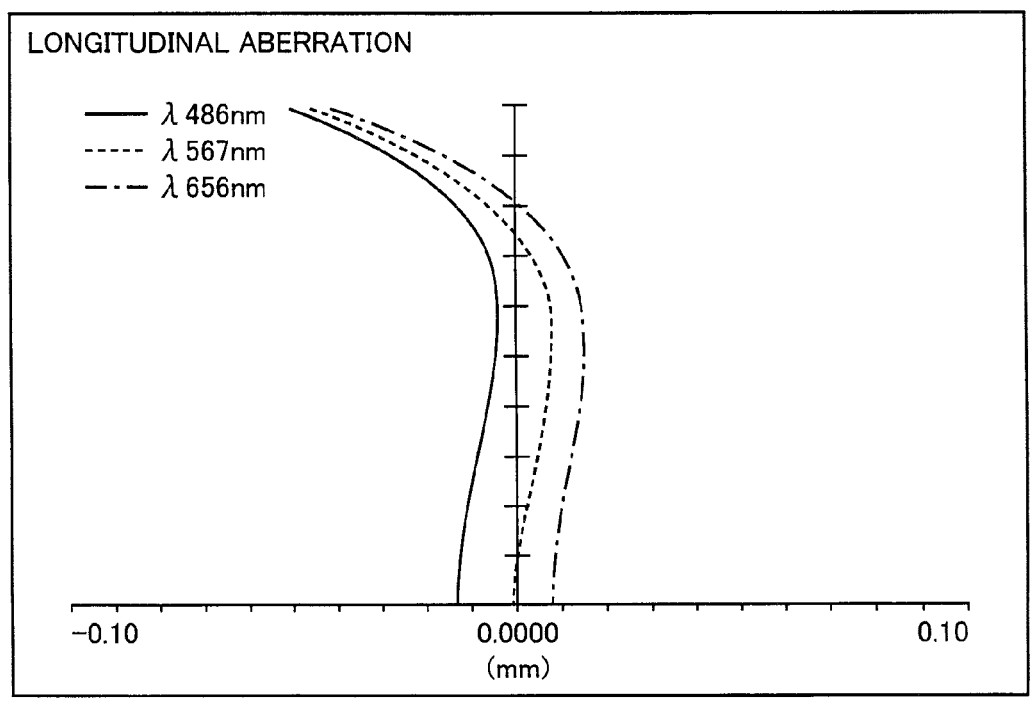
FIG. 8 is a graph showing simulation results of longitudinal aberration in the photographing lens unit according to the first embodiment of the present invention.

FIG. 8 is a graph showing simulation results of the longitudinal aberration in photographing lens unit 1P according to the first embodiment of the present invention. As shown in FIG. 7, it was confirmed that in the respective wavelengths, deviation amounts of longitudinal aberration are within the range of a desired standard (±0.10 mm).

Figure 9:
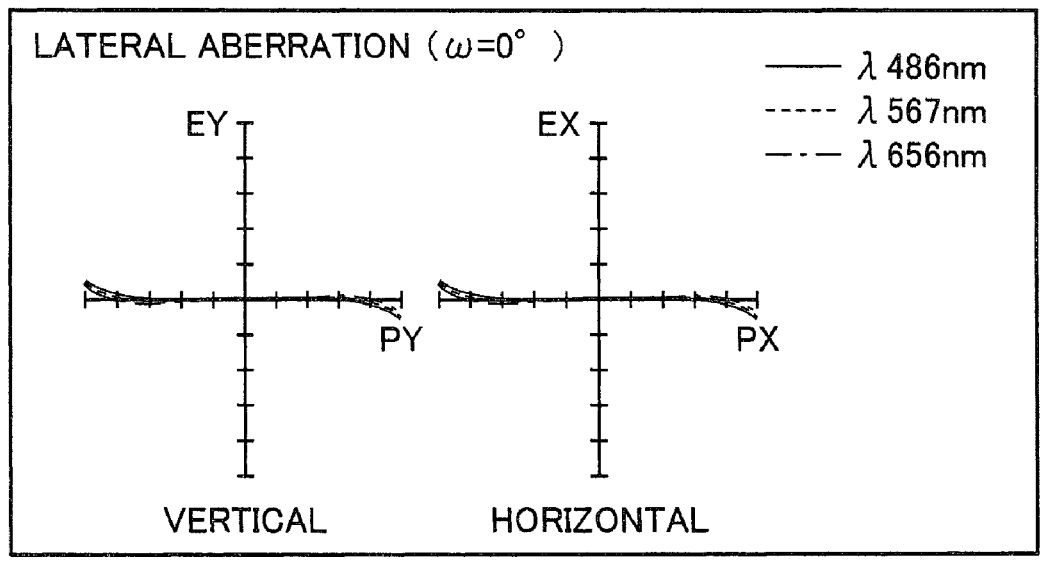
FIG. 9 is a first graph showing simulation results of lateral aberration in the photographing lens unit according to the first embodiment of the present invention.
Figure 10:
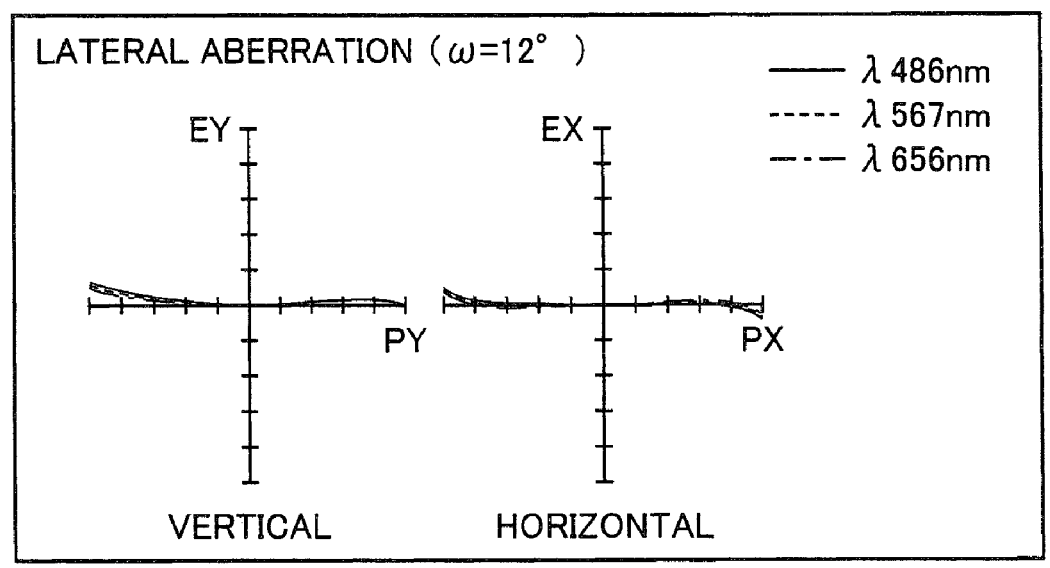
FIG. 10 is a second graph showing simulation results of lateral aberration in the photographing lens unit according to the first embodiment of the present invention.
Figure 11:
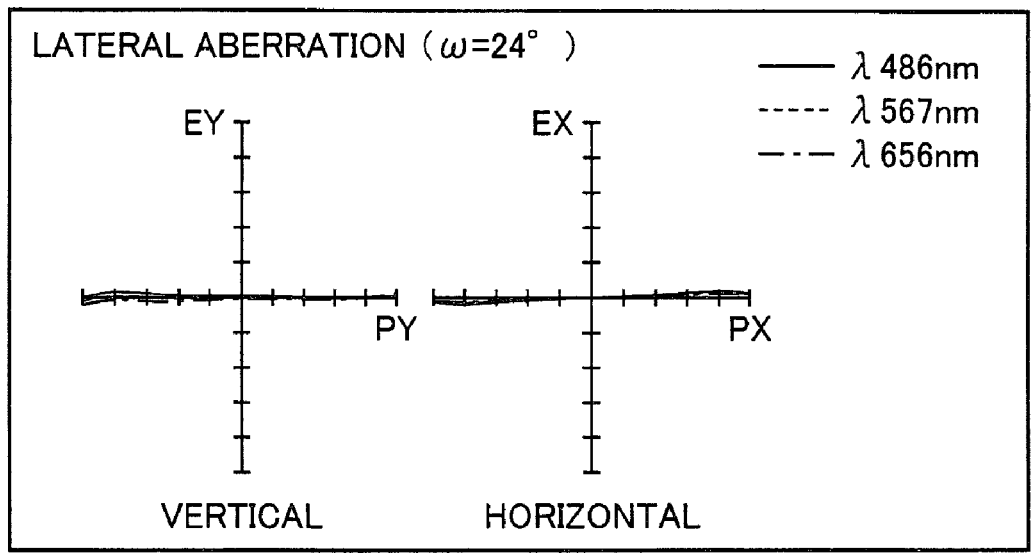
FIG. 11 is a third graph showing simulation results of lateral aberration in the photographing lens unit according to the first embodiment of the present invention.
Figure 12:
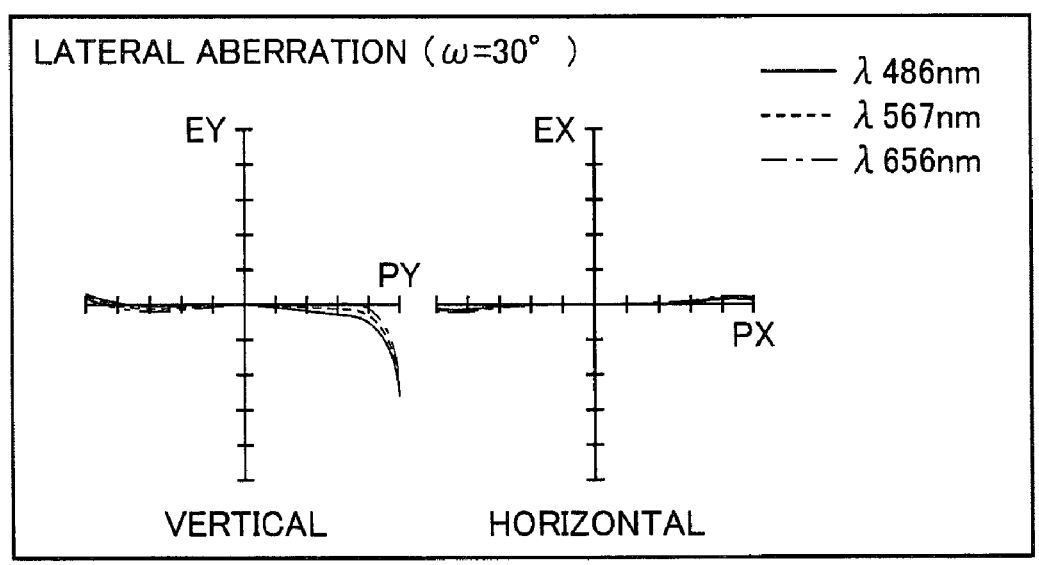
FIG. 12 is a fourth graph showing simulation results of lateral aberration in the photographing lens unit according to the first embodiment of the present invention.

Next, graphs of simulation results of lateral aberration are shown in FIGS. 9 to 12. In FIG. 9, deviation amounts in the sagittal plane and tangential plane are shown in the case where a half angle of view $\omega$ is 0 degree, in FIG. 10, in the case where half angle of view $\omega$ is 12 degrees, in FIG. 11, in the case where half angle of view $\omega$ is 24 degrees, and in FIG. 12, in the case where half angle of view $\omega$ is 30 degrees, respectively. In FIGS. 9 to 12, one graduation of a coordinate axis is 100 µm. As shown in each graph, it was confirmed that the deviation amounts of lateral aberration are almost within the range of 100 µm or less.

As shown in the simulation results of FIGS. 6 to 12, favorable aberration characteristics can also be obtained in the lens configuration in which a space of 1.0 mm or more including ND filter 6P with a thickness of 0.3 mm is provided between third lens 5P and fourth lens 7P of photographing lens unit 1P. Moreover, the entire length of photographing lens unit 1P can be 5.82 mm, which is very compact.

As described above, photographing lens unit 1P of the first embodiment includes first lens 3P having positive refractive power, second lens 4P having negative refractive power, third lens 5P, which is a positive meniscus lens with the concave surface on the object side, and fourth lens 7P, which is a negative meniscus lens with the convex surface on the object side in order from the object side, and has a predetermined space for inserting an optical member between third lens 5P and fourth lens 7P.

By arranging the lenses as described above, a photographing lens unit in which the entire length as a camera module is shortened while favorably correcting aberrations can be achieved. As a result, a high-performance, compact photographing lens unit used in a small imaging apparatus preferable for a film camera, a digital camera, a mobile phone camera, and the like can be realized. Moreover, by providing a predetermined space between the third lens and the fourth lens, the optical properties of the camera can be adjusted without bringing about an increase in size as a camera module.

Furthermore, in third lens 5P, the surface shape on the object side is concave around the optical axis and changes from concave to convex as it is away from the optical axis, and the surface shape on the image side is convex around the optical axis and changes from convex to concave as it is away from the optical axis. Moreover, in fourth lens 7P, the surface shape on the object side is convex around the optical axis and changes from convex to concave as it is away from the optical axis, and the surface shape on the image side is concave around the optical axis and changes from concave to convex as it is away from the optical axis.

By changing the shapes of the third and fourth lenses as described above, the distortion aberration, curvature of field, and astigmatism can be further reduced while minimizing an increase in size as a camera module.

Second Embodiment

Figure 13:
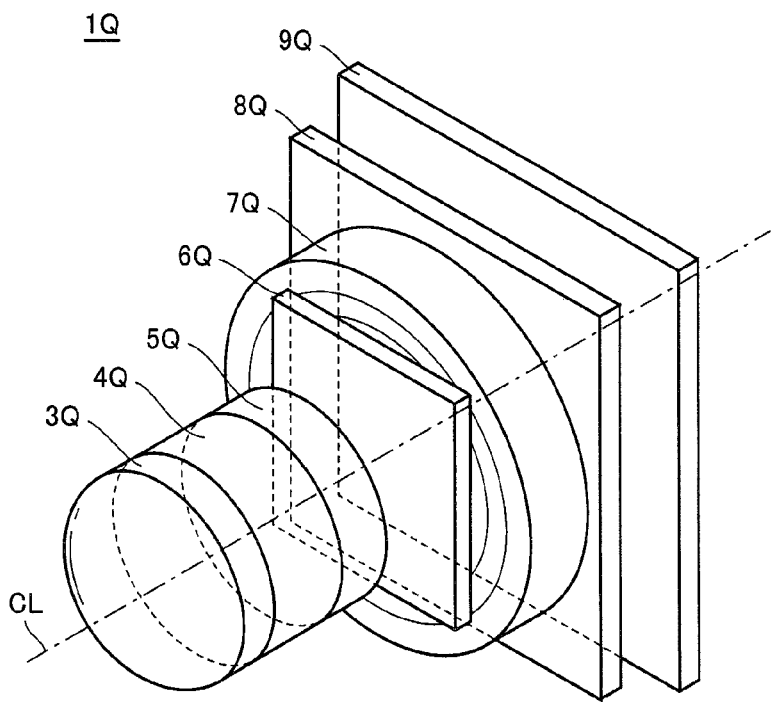
FIG. 13 is a perspective view showing a schematic configuration of a photographing lens unit according to a second embodiment of the present invention.
Figure 14:
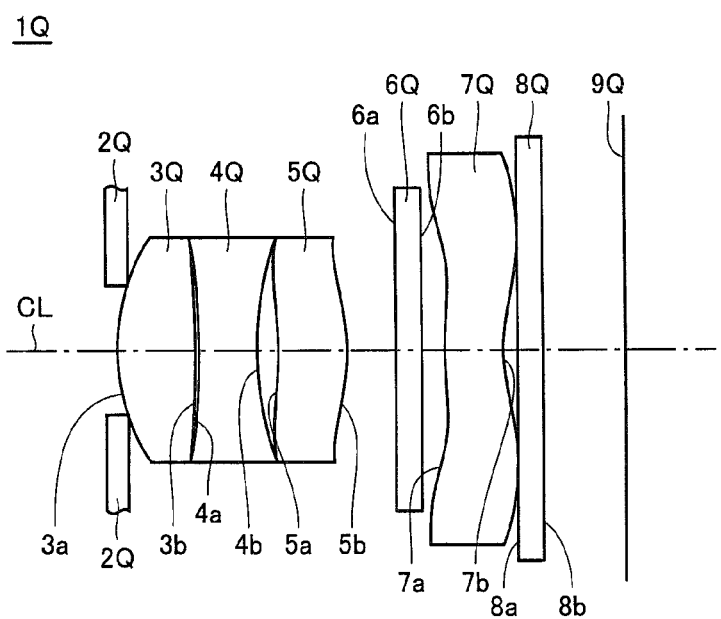
FIG. 14 is a cross-sectional view along an optical axis of the photographing lens unit according to the second embodiment of the present invention.

FIG. 13 is a perspective view showing a schematic configuration of a photographing lens unit 1Q according to a second embodiment of the present invention. FIG. 14 is a cross-sectional view along an optical axis CL of photographing lens unit 1Q according to the second embodiment of the present invention.

Referring to FIGS. 13 and 14, in photographing lens unit 1Q of the second embodiment, as in the first embodiment, an aperture diaphragm 2Q, a first lens 3Q having positive refractive power, a second lens 4Q having negative refractive power, a third lens 5Q of a positive meniscus lens, an ND filter 6Q, a fourth lens 7Q of a negative meniscus lens, an IR cut filter 8Q, and an imaging element 9Q are disposed in order from the object side to the imaging element side.

As described above, since the components of photographing lens unit 1Q are similar to those of photographing lens unit 1P, and the concave and convex shapes of each of the lenses correspond to those of photographing lens unit 1P, descriptions of overlapping parts are not repeated here. First lens 3Q and second lens 4Q of the second embodiment are both glass lenses, and they do not constitute a hybrid lens.

Figure 15:
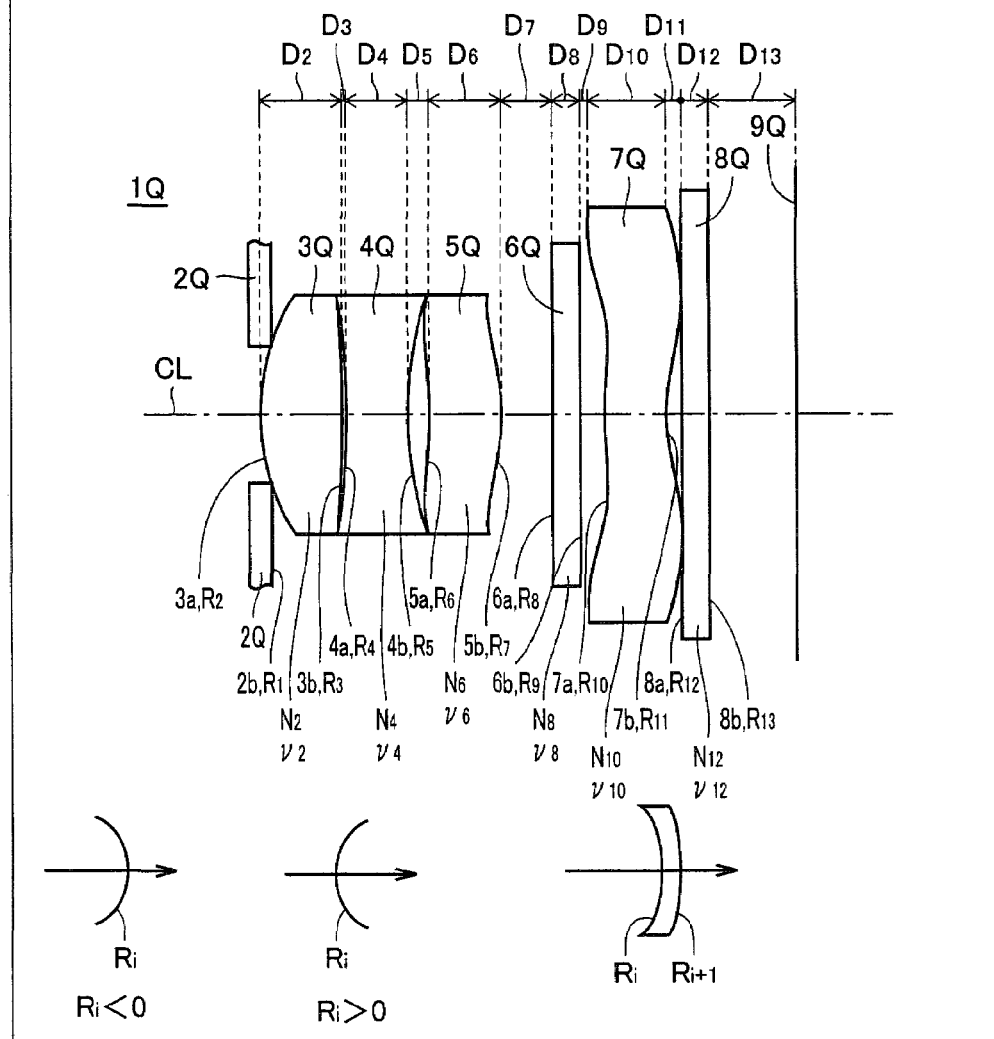
FIG. 15 is a diagram showing shapes and arrangement relations of the photographing lens unit according to the second embodiment of the present invention.

FIG. 15 is a diagram showing the shapes and the arrangement relations of photographing lens unit 1Q according to the second embodiment of the present invention.

Referring to FIG. 15, as in the first embodiment, photographing lens unit 1Q of the second embodiment is a compound lens for the imaging element of ⅓ inches with a synthetic focal distance f=5.2 mm, an F number FNO=3, and a half angle of view of 30 degrees. In FIG. 15, the correspondences of curvature radius Ri of surfaces, surface distance Di, refractive index Ni, and Abbe number vi to the figure are as described in the first embodiment. These specific numeric values are shown in an upper portion of FIG. 15.

Figure 16:
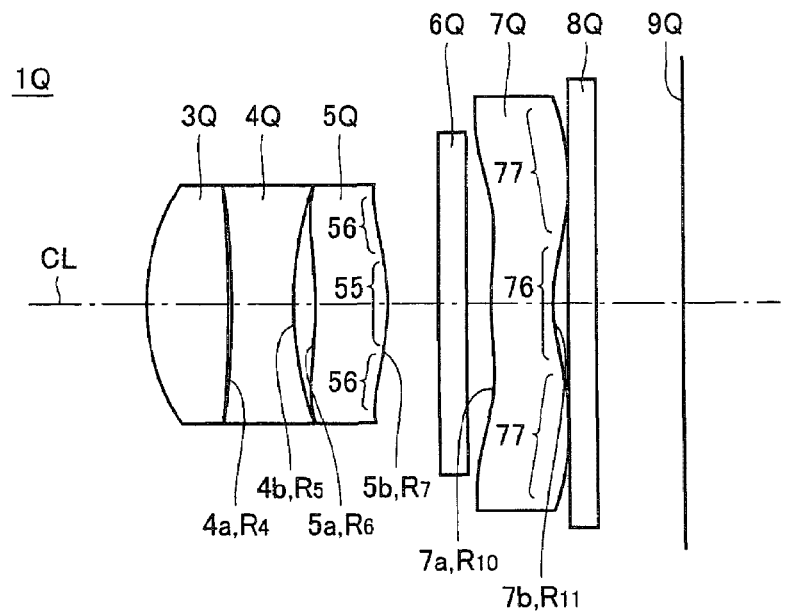
FIG. 16 is a diagram showing characteristics of aspherical lenses in the photographing lens unit according to the second embodiment of the present invention.
Figure 16:
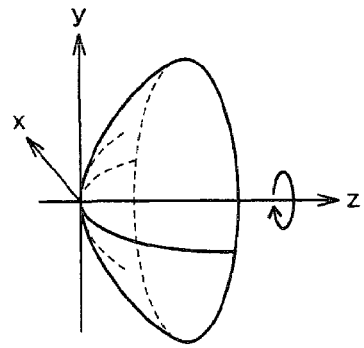

FIG. 16 is a diagram showing characteristics of aspherical lenses in photographing lens unit 1Q according to the second embodiment of the present invention.

Referring to FIG. 16, aspherical lens surfaces 5a, 5b, 7a, and 7b are represented by assigning corresponding values to aspherical surface coefficients A4, A6, A8, and A10 in an equation shown in the lower portion of FIG. 16. Lens surfaces 5a, 5b, 7a, and 7b correspond to curvature radii R6, R7, R10, and R11, respectively.

According to the equation in the lower portion of FIG. 16, for example, lens surface 5b (i=7) of third lens 5Q on the image side changes from a convex surface 55 to a concave surface 56 as it is away from optical axis CL. Moreover, for example, lens surface 7b (i=11) of fourth lens 7Q on the image side changes from a concave surface 76 to a convex surface 77 as it is away from optical axis CL.

Figure 17:
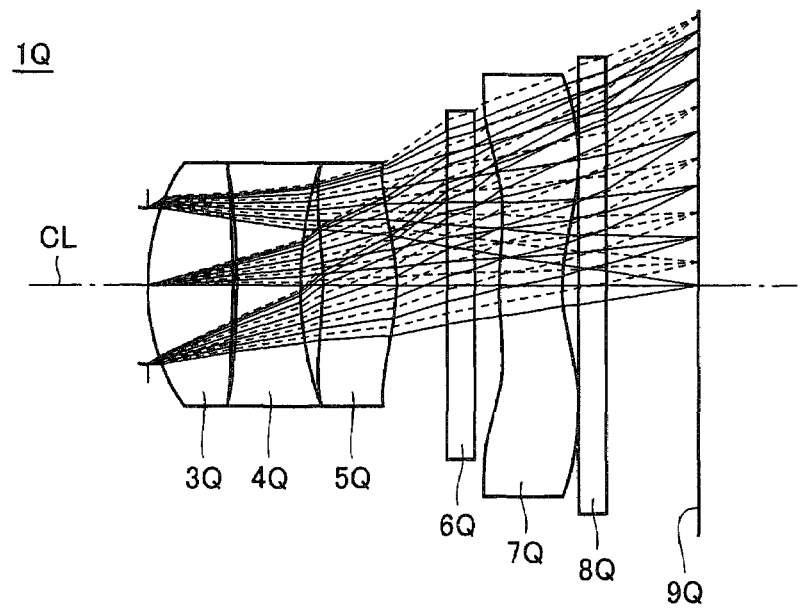
FIG. 17 is a diagram showing a portion of an optical path in the photographing lens unit according to the second embodiment of the present invention.

FIG. 17 is a diagram showing a portion of an optical path in photographing lens unit 1Q according to the second embodiment of the present invention. As shown in FIG. 17, the half angle of view of the photographing lens unit 1Q becomes larger as it is away from optical axis CL until the half angle of view becomes 30 degrees at an end portion of imaging element 9Q.

Next, as optical properties of photographing lens unit 1Q, as in the first embodiment, evaluation results of curvature of field, distortion aberration, longitudinal aberration, and lateral aberration by simulations based on three wavelengths ($\lambda$=486 nm, 567 nm, 656 nm).

Figure 18:
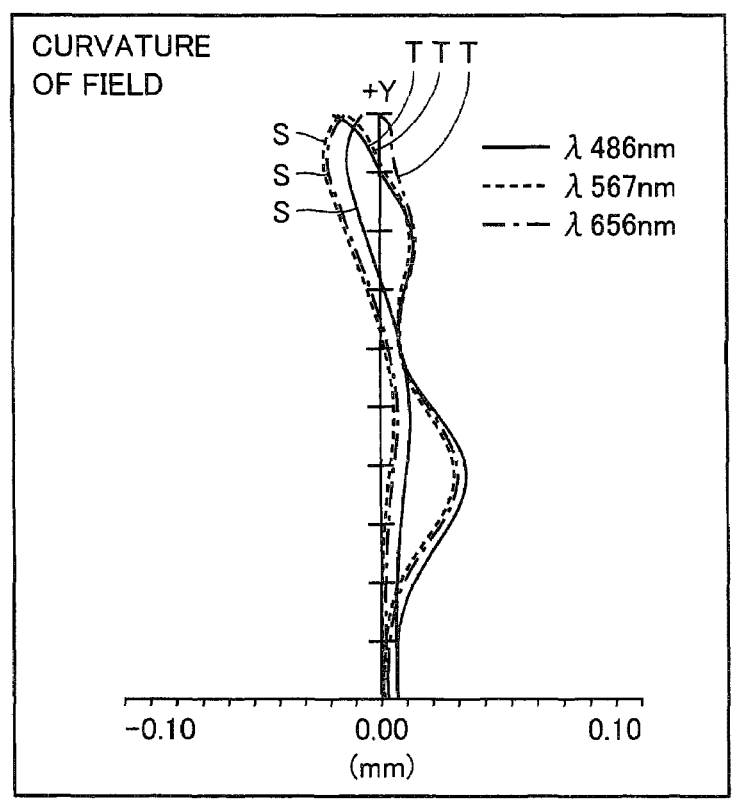
FIG. 18 is a graph showing simulation results of curvature of field in the photographing lens unit according to the second embodiment of the present invention.

FIG. 18 is a graph showing simulation results of curvature of field in photographing lens unit 1Q according to the second embodiment of the present invention. As shown in FIG. 18, it was confirmed that in the respective wavelengths, deviation amounts from the image surface, regardless of tangential plane T and sagittal plane S, are within the range of a desired standard (±0.10 mm).

Figure 19:
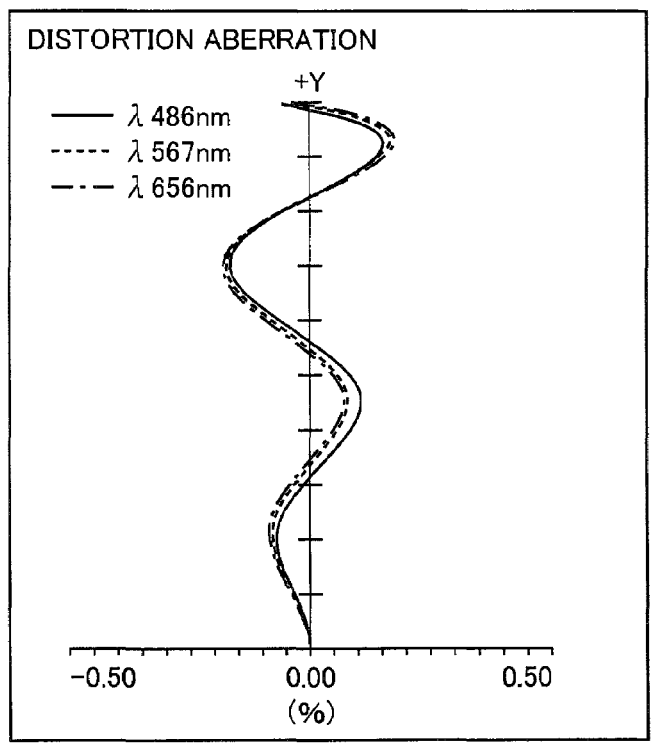
FIG. 19 is a graph showing simulation results of distortion aberration in the photographing lens unit according to the second embodiment of the present invention.

FIG. 19 is a graph showing simulation results of the distortion aberration in photographing lens unit 1Q according to the second embodiment of the present invention. As shown in FIG. 19, it was confirmed that in the respective wavelengths, distortions of photographing lens unit 1Q are within the range of a desired standard (±0.50%).

Figure 20:
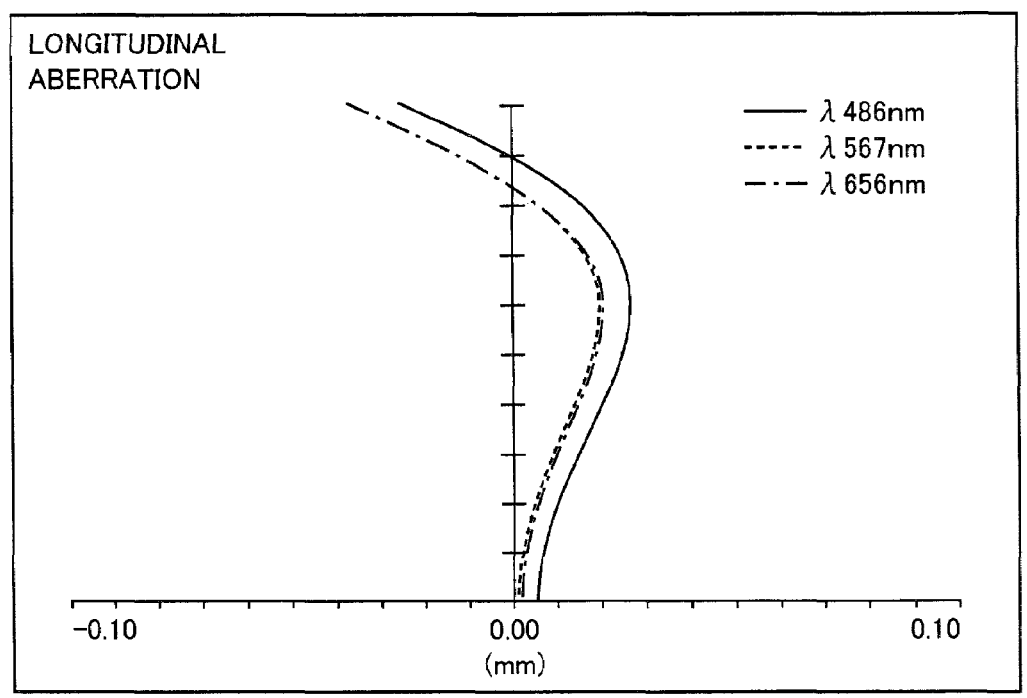
FIG. 20 is a graph showing simulation results of longitudinal aberration in the photographing lens unit according to the second embodiment of the present invention.

FIG. 20 is a graph showing simulation results of the longitudinal aberration in photographing lens unit 1Q according to the second embodiment of the present invention. As shown in FIG. 20, it was confirmed that in the respective wavelengths, deviation amounts of longitudinal aberration are within the range of a desired standard (±0.10 mm).

Figure 21:
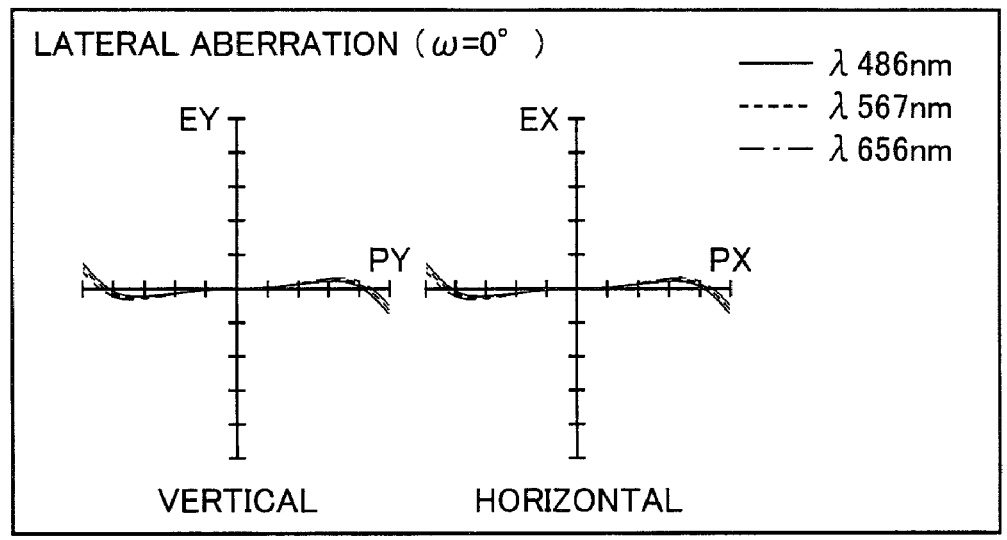
FIG. 21 is a first graph showing simulation results of lateral aberration in the photographing lens unit according to the second embodiment of the present invention.
Figure 22:
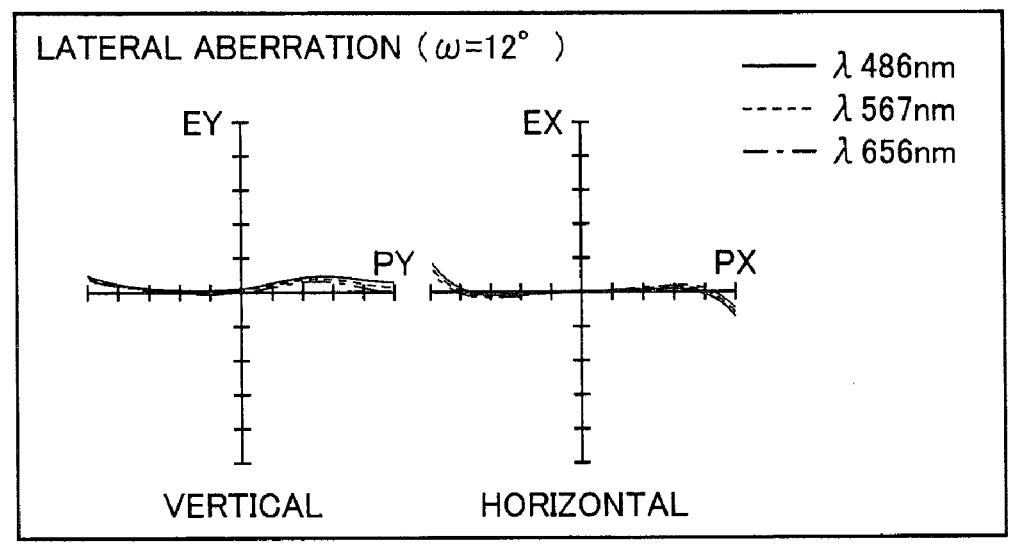
FIG. 22 is a second graph showing simulation results of lateral aberration in the photographing lens unit according to the second embodiment of the present invention.
Figure 23:
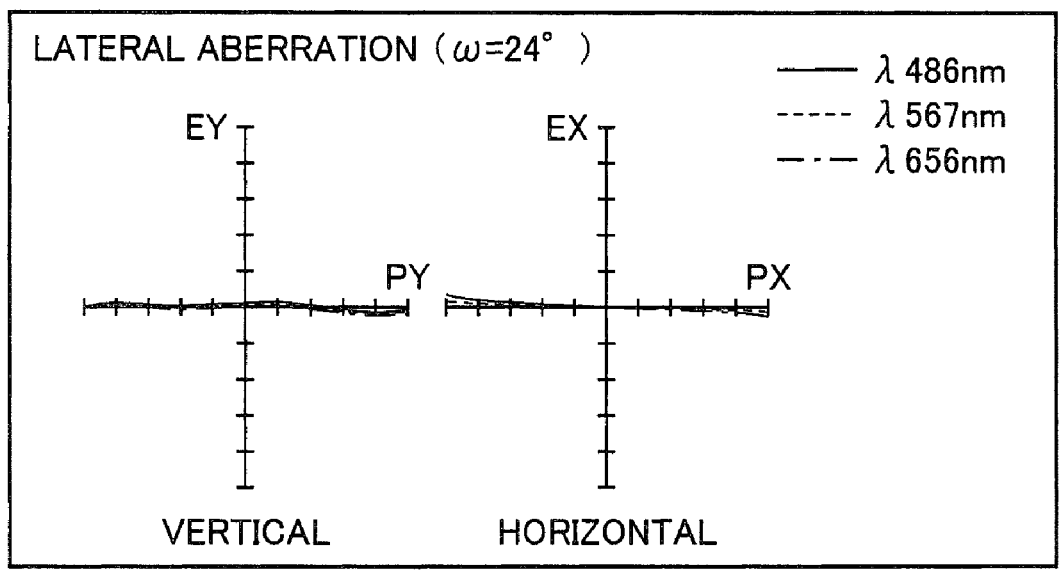
FIG. 23 is a third graph showing simulation results of lateral aberration in the photographing lens unit according to the second embodiment of the present invention.
Figure 24:
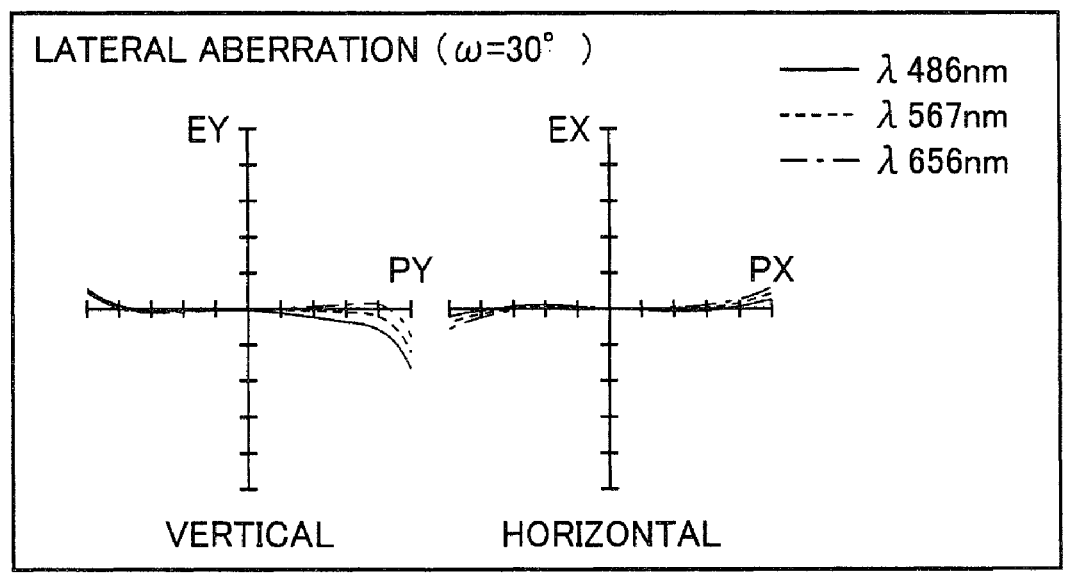
FIG. 24 is a fourth graph showing simulation results of lateral aberration in the photographing lens unit according to the second embodiment of the present invention.

Next, graphs of simulation results of lateral aberration are shown in FIGS. 21 to 24. In FIG. 21, deviation amounts in the sagittal plane and tangential plane are shown in the case where half angle of view $\omega$ is 0 degree, in FIG. 22, in the case where half angle of view $\omega$ is 12 degrees, in FIG. 23, in the case where half angle of view $\omega$ is 24 degrees, and in FIG. 24, in the case where half angle of view $\omega$ is 30 degrees, respectively. As shown in each of the graphs, it was confirmed that the deviation amounts of lateral aberration are almost within the range of 100 μm or less, which is within one graduation.

As shown in the simulation results of FIGS. 18 to 24, favorable aberration characteristics can also be obtained in the lens configuration in which a space of 1.0 mm or more including ND filter 6Q with a thickness of 0.3 mm is provided between third lens 5Q and fourth lens 7Q of photographing lens unit 1Q. Moreover, the entire length of photographing lens unit 1Q can be 6.15 mm, which is very compact, although the use of the two glass lenses instead of the hybrid lens makes the entire length larger than that of the first embodiment.

As described above, as in the first embodiment, photographing lens unit 1Q of the second embodiment includes first lens 3Q having positive refractive power, second lens 4Q having negative refractive power, third lens 5Q, which is a positive meniscus lens with the concave surface on the object side, and a fourth lens 7Q, which is a negative meniscus lens with the convex surface on the object side in order from the object side, and has a predetermined space for inserting an optical member between third lens 5Q and fourth lens 7Q.

In photographing lens unit 1Q of the second embodiment, the shapes and materials of each of the lenses are slightly different from those of the first embodiment. For example, first lens 3Q and second lens 4Q are both glass lenses, and they do not constitute a hybrid lens.

However, by arranging the lenses as described above, a photographing lens unit in which the entire length as a camera module is shortened while favorably correcting the aberrations can be obtained as in the first embodiment. As a result, both the enhanced performance and downsizing can be achieved, and a photographing lens unit with a bright F value, wide angle, and high optical performance can be realized. Moreover, by providing a predetermined space between the third lens and the fourth lens, the optical properties of the camera can be adjusted without bringing about an increase in size as a camera module.

Third Embodiment

Figure 25:
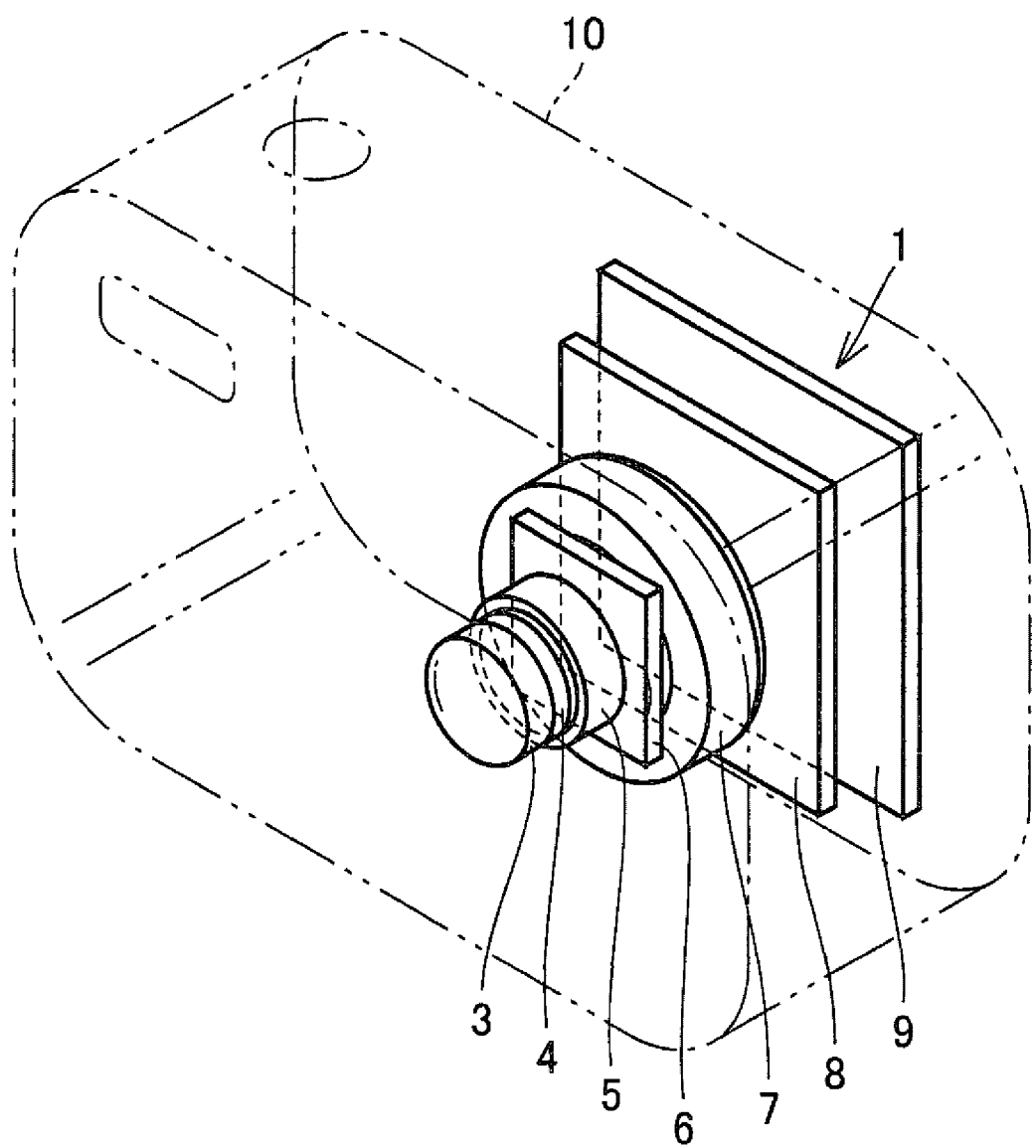
FIG. 25 is a perspective view schematically showing a digital camera according to a third embodiment of the present invention.

FIG. 25 is a perspective view schematically showing a digital camera 10 according to a third embodiment of the present invention.

In the following, photographing lens unit 1P of the first embodiment and photographing lens unit 1Q of the second embodiment are collectively referred to as a photographing lens unit 1. Digital camera 10 of FIG. 25 is one example of an imaging apparatus to which photographing lens unit 1 described above is applied. As shown in FIG. 25, a camera module including photographing lens unit 1 is incorporated in digital camera 10.

Referring to FIG. 25, in digital camera 10, a first lens 3 and a second lens 4 are a hybrid lens, and second lens 4 is molded from resin. Variation in thickness of first lens 3 can be thereby canceled out by second lens 4. As a result, among tolerances for assembling photographing lens unit 1, the tolerance of a distance between second lens 4 and third lens 5 can be made small.

Moreover, as described above, by forming lens surfaces 5a, 5b, 7a, and 7b of third lens 5 and fourth lens 7 into respective predetermined shapes, the aberrations can be reduced without bringing about an increase in entire length of the camera module. As a result, the entire length can be made shorter while assuring the optical properties of digital camera 10, so that the downsizing of digital camera 10 can be achieved.

Although in FIG. 25, a digital camera is taken as one example of the imaging apparatus, this is merely an example. The camera module of photographing lens unit 1 according to the embodiments of the present invention is not limited to digital cameras, but it can be widely applied to an imaging apparatus that takes in an image, including a mobile phone, for example.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A photographing lens unit comprising:
    a first lens having positive refractive power;
    a second lens that is disposed on the image side with respect to said first lens and has negative refractive power;
    a third lens that is disposed on the image side with respect to said second lens and is a positive meniscus lens with a concave surface on the object side thereof; and
    a fourth lens that is disposed on the image side with respect to said third lens and is a negative meniscus lens with a convex surface on the object side thereof, wherein
    a surface shape of said third lens changes from a concave surface to a convex surface on the object side as the surface shape is away from an optical axis, and changes from a convex surface to a concave surface on the image side as the surface shape is away from the optical axis, and
    a surface shape of said fourth lens changes from a convex surface to a concave surface on the object side as the surface shape is away from the optical axis, and changes from a concave surface to a convex surface on the image side as the surface shape is away from the optical axis.

2. The photographing lens unit according to claim 1, further comprising an imaging element that receives light transmitted through said fourth lens, wherein
    a space for arranging an optical member is provided between said third lens and said fourth lens, and said optical member is one of a member that limits an amount of light entering said imaging element and a member that bends an optical axis of the light entering said imaging element.

3. The photographing lens unit according to claim 1, wherein said first lens, said second lens, and said third lens are moved along the optical axis at the time of focusing operation.

4. The photographing lens unit according to claim 1, wherein said first lens and said second lens constitute a hybrid lens formed of different materials.

5. The photographing lens unit according to claim 1, wherein an Abbe number of said third lens is not more than 35.

6. An imaging apparatus comprising a photographing lens unit, said photographing lens unit comprising:
    a first lens having positive refractive power;
    a second lens that is disposed on the image side with respect to said first lens and has negative refractive power;
    a third lens that is disposed on the image side with respect to said second lens and is a positive meniscus lens with a concave surface on the object side thereof; and
    a fourth lens that is disposed on the image side with respect to said third lens and is a negative meniscus lens with a convex surface on the object side thereof, wherein
    a surface shape of said third lens changes from a concave surface to a convex surface on the object side as the surface shape is away from an optical axis, and changes from a convex surface to a concave surface on the image side as the surface shape is away from the optical axis, and
    a surface shape of said fourth lens changes from a convex surface to a concave surface on the object side as the surface shape is away from the optical axis, and changes from a concave surface to a convex surface on the image side as the surface shape is away from the optical axis.

7. The imaging apparatus according to claim 6, further comprising an imaging element that receives light transmitted through said fourth lens, wherein
    a space for arranging an optical member is provided between said third lens and said fourth lens, and said optical member is one of a member that limits an amount of light entering said imaging element and a member that bends an optical axis of the light entering said imaging element.

8. The imaging apparatus according to claim 6, wherein said first lens, said second lens, and said third lens are moved along the optical axis at the time of focusing operation.

9. The imaging apparatus according to claim 6, wherein said first lens and said second lens constitute a hybrid lens formed of different materials.

10. The imaging apparatus according to claim 6, wherein an Abbe number of said third lens is not more than 35.

* * * * *